United States Patent
Ramankutty et al.

(10) Patent No.: US 8,582,473 B2
(45) Date of Patent: *Nov. 12, 2013

(54) PROVIDING SERVICES TO PACKET FLOWS IN A NETWORK

(75) Inventors: Rajesh Ramankutty, Nashua, NH (US); Sanil Kumar Puthiyandyil, Nashua, NH (US); Matthew H. Harper, Salem, NH (US); Timothy G. Mortsolf, Palatine, IL (US)

(73) Assignee: Cisco Technology, Inc., San Jose, CA (US)

(*) Notice: Subject to any disclaimer, the term of this patent is extended or adjusted under 35 U.S.C. 154(b) by 312 days.

This patent is subject to a terminal disclaimer.

(21) Appl. No.: 12/944,594

(22) Filed: Nov. 11, 2010

(65) Prior Publication Data

US 2011/0116378 A1 May 19, 2011

Related U.S. Application Data

(63) Continuation of application No. 11/942,446, filed on Nov. 19, 2007, now Pat. No. 7,855,982.

(51) Int. Cl.
*H04L 12/16* (2006.01)

(52) U.S. Cl.
USPC .......................................................... 370/259

(58) Field of Classification Search
USPC .......... 370/259, 310, 351–356; 455/405–409; 709/220, 227–229, 249
See application file for complete search history.

(56) References Cited

U.S. PATENT DOCUMENTS

| 6,119,160 | A  | 9/2000  | Zhang et al.    |
| 6,477,590 | B1 | 11/2002 | Habusha et al.  |
| 6,687,252 | B1 | 2/2004  | Bertrand et al. |
| 6,714,987 | B1 | 3/2004  | Amin et al.     |
| 6,741,853 | B1 | 5/2004  | Jiang et al.    |
| 6,775,273 | B1 | 8/2004  | Kung et al.     |
| 6,778,494 | B1 | 8/2004  | Mauger          |

(Continued)

FOREIGN PATENT DOCUMENTS

| WO | WO-02/056622 A1   | 7/2002  |
| WO | WO-2006/118497 A1 | 11/2006 |
| WO | WO-2007/048013 A2 | 4/2007  |
| WO | WO-2009/150499 A1 | 12/2009 |

OTHER PUBLICATIONS

"Gateway Load Balancing Protocol Overview", Cisco White Paper (2004) (24 pages).

(Continued)

*Primary Examiner* — Dmitry H Levitan
(74) *Attorney, Agent, or Firm* — Wilmer Cutler Pickering Hale and Dorr LLP

(57) ABSTRACT

A system and method for providing services to packet flows in a communication network. The services include enhanced charging, stateful firewalls, traffic performance optimization (TPO) and advanced services such as content differentiated charging, per-subscriber stateful firewalls, and VPNs, for example. A gateway can be used to route each packet flow through the services on a per-subscriber basis by inspecting accounting messages and checking subscriber profiles prior to setting up a new packet flow session. By directing the packet flow through the services requested latency can be reduced as well as the need to have equipment for each session regardless of whether the service is provided to the packet flow. The services can be provided in-line as well.

20 Claims, 13 Drawing Sheets

(56) References Cited

U.S. PATENT DOCUMENTS

| | | | |
|---|---|---|---|
| 6,853,630 B1 | 2/2005 | Manning | |
| 6,854,014 B1 | 2/2005 | Amin et al. | |
| 6,910,074 B1 | 6/2005 | Amin et al. | |
| 6,973,309 B1 | 12/2005 | Rygula et al. | |
| 7,269,727 B1* | 9/2007 | Mukherjee et al. | 713/160 |
| 7,292,538 B1* | 11/2007 | O'Rourke et al. | 370/252 |
| 7,324,551 B1 | 1/2008 | Stammers | |
| 7,454,206 B1 | 11/2008 | Phillips et al. | |
| 7,529,711 B2 | 5/2009 | Reith | |
| 7,855,982 B2 | 12/2010 | Ramankutty et al. | |
| 8,266,696 B2* | 9/2012 | O'Rourke et al. | 726/23 |
| 2001/0053694 A1 | 12/2001 | Igarashi et al. | |
| 2002/0126656 A1* | 9/2002 | Park | 370/352 |
| 2007/0022199 A1 | 1/2007 | Tatsubori | |
| 2007/0206515 A1 | 9/2007 | Andreasen et al. | |
| 2009/0054037 A1 | 2/2009 | Kaippallimalil | |
| 2009/0129386 A1* | 5/2009 | Rune | 370/392 |

OTHER PUBLICATIONS

International Search Report and Written Opinion issued for corresponding International Patent Application No. PCT/US2008/083911 (5 pages).

Extended European Search Report issued for EP 08852798.1; dated Nov. 2, 2010 (7 pages).

Guo, et al., "Optimal Customer Provisioning in Network-Based Mobile VPNs", The First Annual International Conference on Mobile and Ubiquitous Systems: Networking and Services, 2004 (10 pages).

International Search Report issued in PCT/US2010/026239, mailed Jun. 18, 2010 (4 pages).

\* cited by examiner

PROVIDING SERVICES TO PACKET FLOWS IN A NETWORK

CROSS-REFERENCE SECTION

This application is a Continuation of currently application Ser. No. 11/942,446, entitled "Providing Services to Packet Flows in a Network", filed Nov. 19, 2007, now U.S. Pat. No. 7,855,982,which is hereby incorporated by reference in its entirety.

FIELD OF THE DISCLOSURE

This disclosure relates to a system and method for providing multiple services in a packet-based communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The packet flow may include a number of packets or a single packet. Services may be applied to a packet flow such as lawful interception (wire tapping), Virtual Private Networks (VPNs), and firewalls.

The typical communication network today often delivers services through externally provisioned server clusters with different application types running on each. Each server cluster runs an application, such as content filtering/parental controls, payload compression, etc., with the new services being introduced by adding equipment to provide the new service. This introduces more equipment that can fail or that can become entry points for a malicious attack, which makes the overall network error-prone and more susceptible to outages due to weak links. FIG. 1 illustrates a topology of how services are provided today. FIG. 1 includes an access gateway 110, load balancers 112, 114, 116, content charging servers 118, optimization servers 120, web caching servers 122, and Internet 124. Since these services are deployed serially, each packet flow will run sequentially through each server cluster whether or not the service is applied to that subscriber. As a result, the operator has to overprovision hardware and software for each service in order to deploy enough bandwidth for all the sessions to flow through each application as well as the load balancers to manage the traffic. Further, operators cannot control the sequence of delivery with the topology of FIG. 1. Without network intelligence, subscriber awareness is limited, making it virtually impossible to offer customized, tiered services and service packages to subscribers. Additionally, each unnecessary hop can add unwanted propagation delay, which can impact latency-sensitive services, such as voice over IP (VoIP), where gaps or delays in conversations ultimately reduce the value of the service.

SUMMARY OF THE DISCLOSURE

Systems and methods for providing one or more services to a packet-based communication flow are disclosed. In some embodiments, a gateway inspects messages that it receives to handle packet flows on a per-subscriber basis. This handling can involve extracting information from certain messages and directing a packet flow based on the information extracted. This extracted information can be used to setup flows so that the packet flow receives the services that are requested by the subscriber. The services may be provided in-line to reduce delays associated with sending packets to an external device for processing.

In some embodiments, a communications apparatus that provides services including at least one network processing unit that includes at least one flow, the at least one flow inspecting a packet flow and directing messages to an IPSG ("IP Services Gateway") manager and a session manager, the IPSG manager receiving an accounting message, extracting information from the accounting message, and sending the information to the session manager, and the session manager directing a packet flow to services specified for that packet flow is provided.

In certain embodiments, a communications networking method including receiving an accounting message at a network processing unit, redirecting the accounting message for inspection, extracting information from the accounting message, and sending the information to a session manager to setup a new session, wherein the session manager directs a packet flow of the new session on a per subscriber basis to provide at least one service to the packet flow is provided.

DETAILED DESCRIPTION

Figure 1:
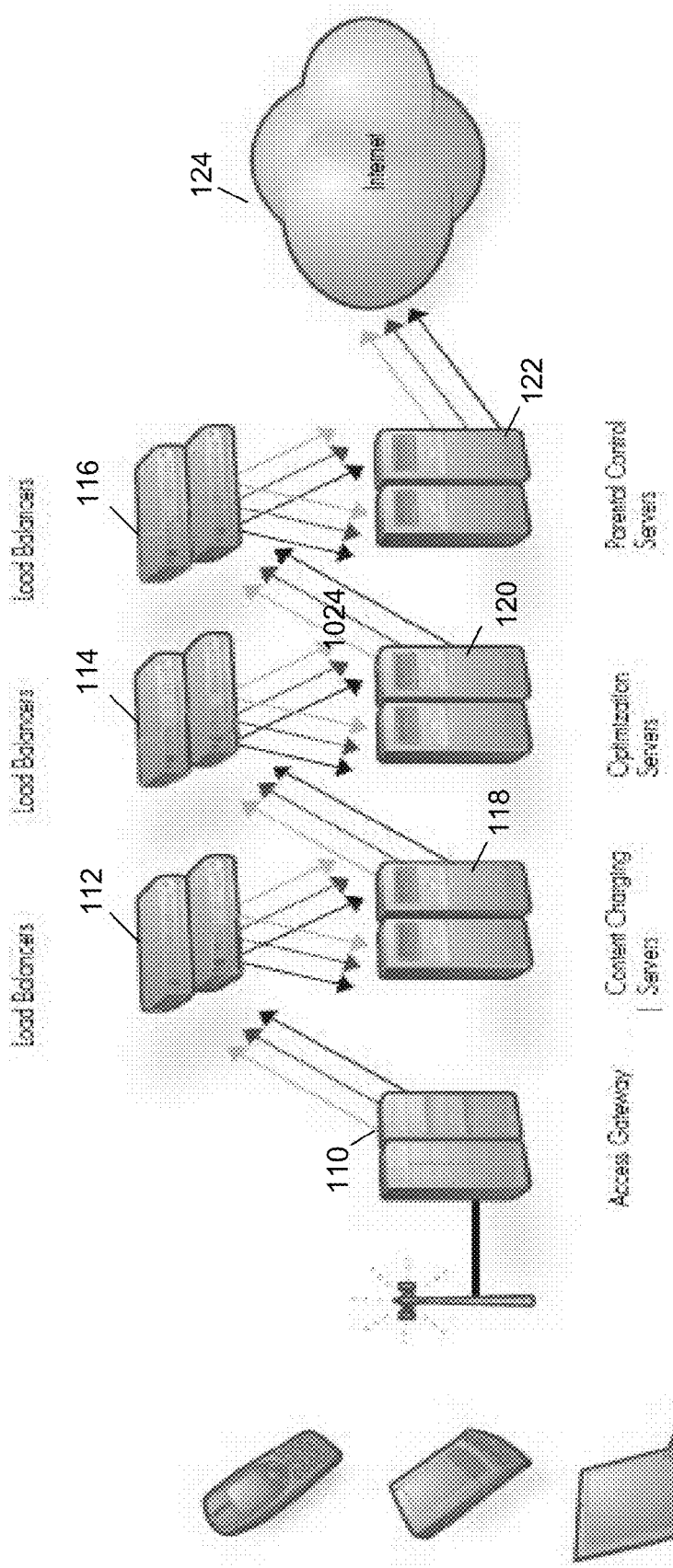
FIG. 1 is a block diagram illustrating provision of services to mobile nodes.

Systems and methods for providing managed services to packet-based flows on a communication network are disclosed in some embodiments. A gateway may be used to implement these managed services on a per-subscriber packet flow basis. The gateway can provide per-subscriber services such as enhanced charging, stateful firewalls, traffic performance optimization (TPO) and advanced services such as content differentiated charging, per-subscriber stateful firewalls, and VPN service, for example, without requiring replacement of legacy access devices nor requiring multiple servers (see FIG. 1). The gateway can also provide the services "in-line" or within the session packet flow, rather than requiring the packet flow be off-loaded to servers elsewhere in the communications network.

Figure 2:
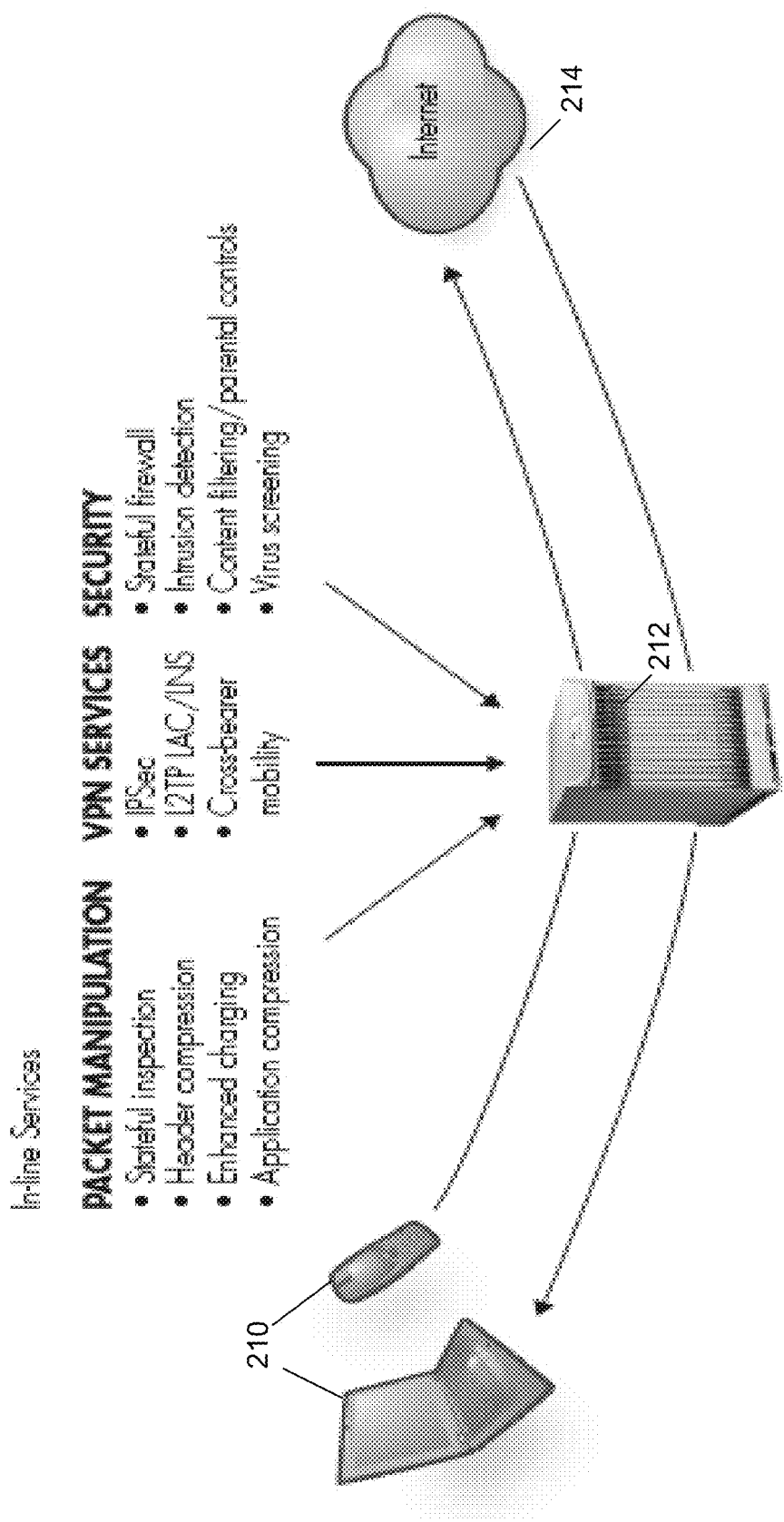
FIG. 2 is a block diagram illustrating provision of in-line services in accordance with certain embodiments.

FIG. 2 illustrates a gateway providing in-line services in a communication network in accordance with some embodiments. FIG. 2 includes mobile nodes 210, gateway 212, and internet 214. As shown, a number of services can be applied at gateway 212 in categories such as packet manipulation (e.g., stateful inspection, header compression, enhanced charging, application compression), VPN services (e.g., IPSec, L2TP LAC/LNS, cross-bearer mobility), and security (e.g., stateful firewall, intrusion detection, content filtering/parenthal controls, virus screening). In some embodiments, services can be provided both internally and externally. For example, various packet manipulation services can be provided by gateway 212, while some VPN services are provided by an external server. Gateway 212 provides the ability to selectively use external server services on a per-flow basis in certain embodiments. Further, gateway 212 can be integrated into the bearer traffic plane at the edge of the packet core network to provide in-line services. In-line services can allow mobile operators to offer new services and scale those services while also simplifying the network topology and the traffic flow.

Figure 3:
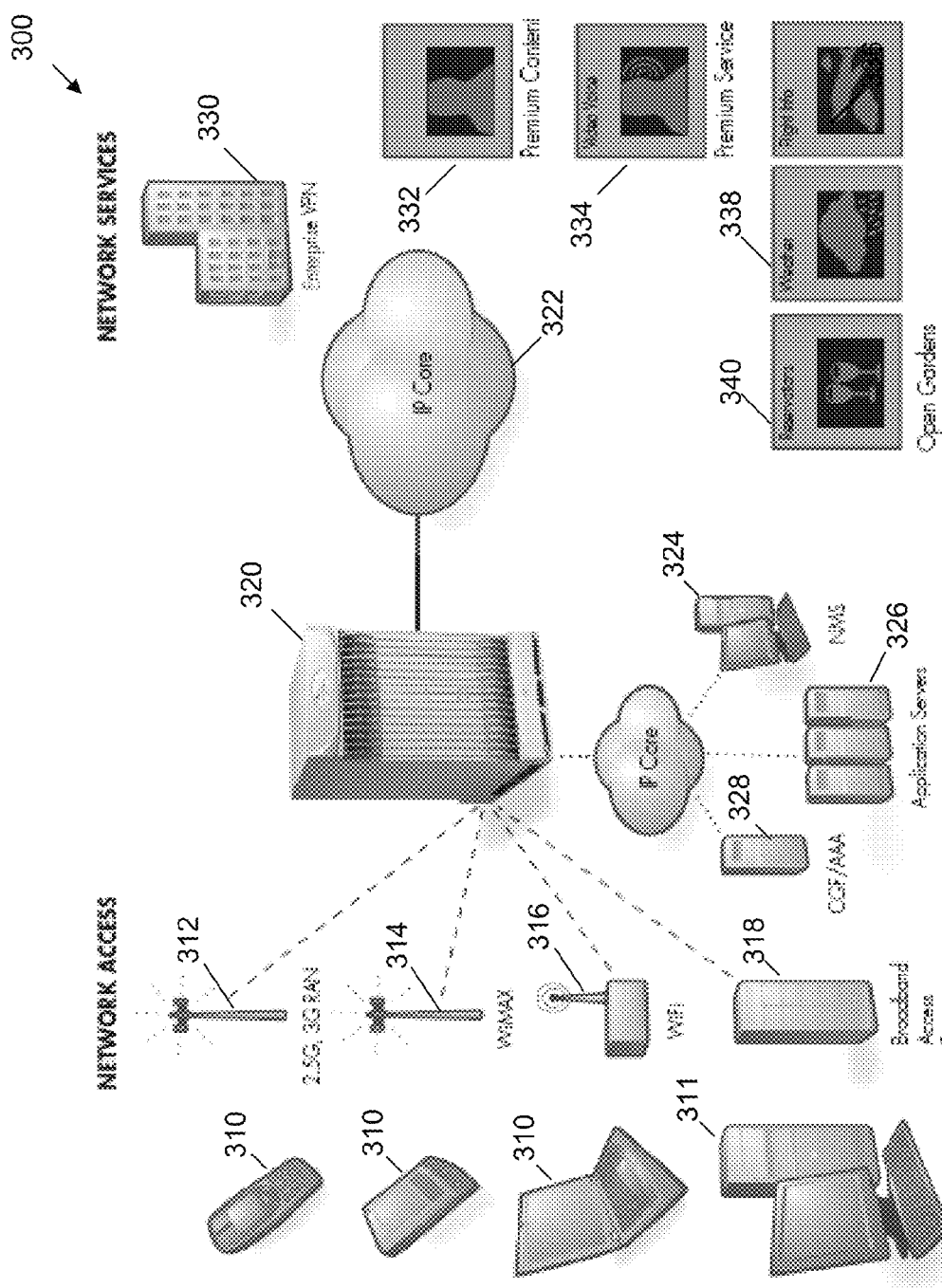
FIG. 3 is a block diagram of a network topology where in-line services are provided in accordance with certain embodiments.

FIG. 3 illustrates a network topology 300 that can deploy in-line services in accordance with some embodiments. Network topology 300 includes mobile nodes 310, computer 311, radio access network (RAN) 312, WiMAX 314, WiFi 316, broadband access server 318, gateway 320, IP core 322, network management system (NMS) 324, application servers 326, charging gateway function (CGF)/authentication, authorization, and accounting (AAA) 328, enterprise VPN 330, and services such as premium content 332, premium service 334, flight info 336, weather 338, and reservations 340. Gateway 320 allows for connections to multiple access technologies as shown. For example, RAN 312 can be 2nd generation (2 G), 2.5 generation (2.5 G), 3rd generation (3 G) network capable, and can be a universal mobile telecommunications system (UMTS), a code division multiple access (CDMA) system, a global system for mobile communications (GSM) system, high packet data rate (HPRD) system, or any other applicable RAN access technology. Also because gateway 320 is subscriber aware, it can individually route subscriber session packet flows through or to the desired services. In certain embodiments, gateway 320 stores location based information about mobile node 310 or computer 311, which gateway provides to application server 326 or uses itself to provide services such as weather 338 or reservations 340. Application servers 326, host and execute services such as caller ID, call waiting, call holding, push-to-talk, call forwarding, call transfer, call blocking services, lawful interception, announcement services, conference call services, voicemail, location based services, and presence information, for example.

In some embodiments, the gateway can setup a session by inspecting the information in signaling protocols such as RADIUS-accounting, DIAMETER, GPRS tunneling protocol (GTP), and Mobile IP (MIP), for example. The gateway can extract (or sniff) an IP-address assigned to the mobile node, a network access identifier (NAI), international mobile subscriber identity (IMSI), mobile subscriber identification (MSID), correlation-ID (for CDMA implementations), user data record (UDR), event data records (EDR), calling-station-ID, and/or any other applicable information. The extracted information is used in setting up a session for the mobile node and can be cached in the gateway, in some embodiments. The extracted information may be cached in a table or other data structure to provide quick lookups based on one of the values, such as IP address. The extracted information can be used to determine the subscriber and can link the extracted information with a subscriber profile. This allows the gateway to provide subscriber awareness to IP packets entering and leaving the gateway and be able to redirect these packets to the services identified by the subscriber profile.

Figure 4:
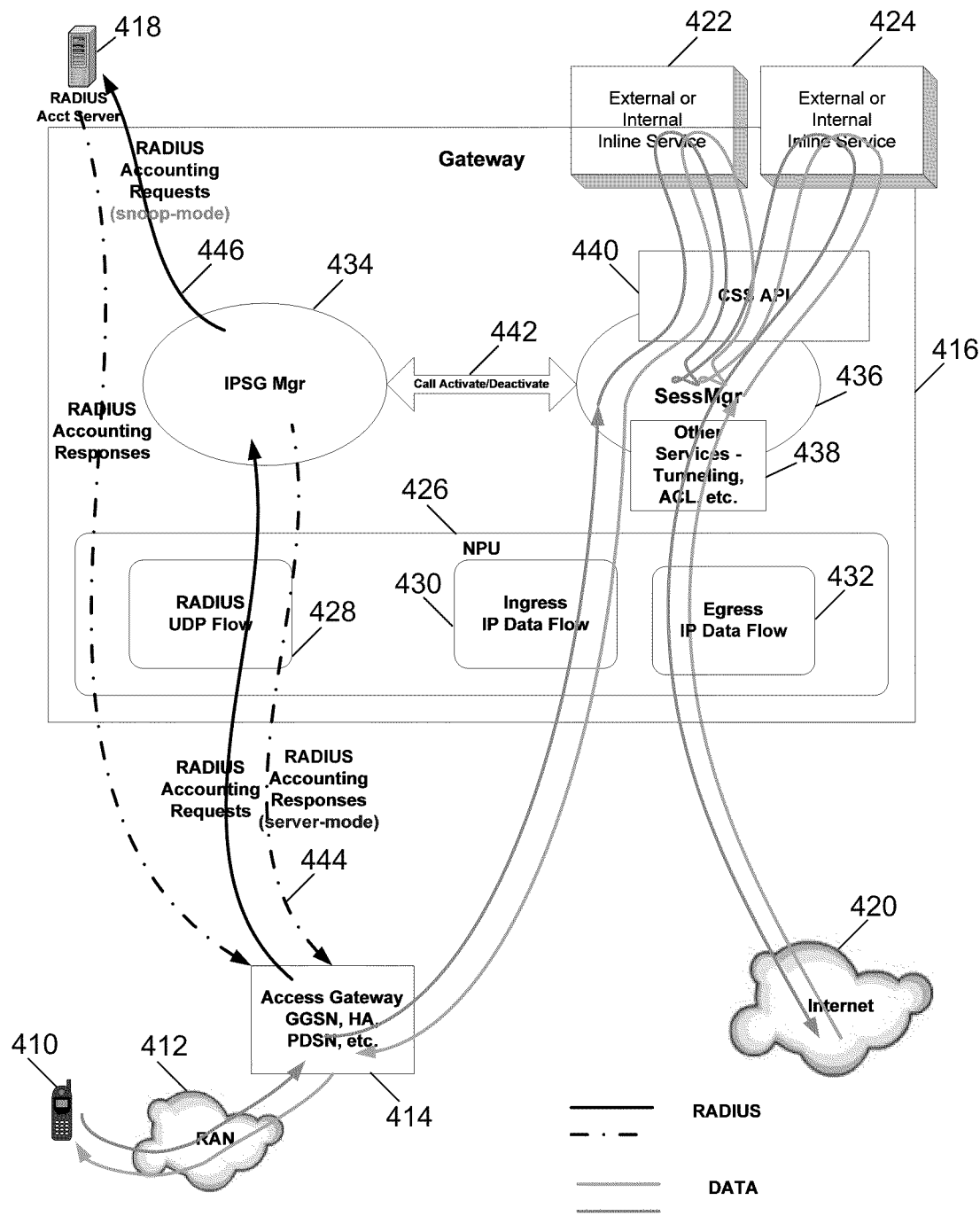
FIG. 4 is a block diagram of flows through a gateway in accordance with certain embodiments.

FIG. 4 illustrates packet flows through a gateway in accordance with some embodiments. FIG. 4 includes a mobile node 410, a radio access network (RAN) 412, an access gateway/GGSN/HA/PDSN 414, a gateway 416, a radius account server 418, an internet 420, and an external or internal in-line service 422 and 424. Gateway 416 includes network processing unit (NPU) 426, RADIUS UDP flow 428, ingress IP data flow 430, egress IP data flow 432, IPSG manager 434, session manager 436, other services module 438, content service steering (CSS) application program interface (API) 440, and module communication 442. RADIUS UDP flow 428, Ingress IP data flow 430, Egress IP data flow 432, IPSG manager 434 and session manager 436 can be implemented in software and can be used to provide the services to a packet flow. RADIUS UDP flow 428 can be used by IPSG manager 434 to monitor RADIUS flows destined to a RADIUS accounting server 418. This can be implemented by monitoring a specified port number for receiving the RADIUS accounting requests sent by access gateway 414.

The RADIUS accounting requests are received by the IPSG manager 434 for processing. The IPSG manager 434 inspects the accounting messages to activate and deactivate sessions in gateway 416. During the inspection of the accounting messages by IPSG manager 434, information is also obtained that can be used to setup the session, authenticate the session, and link the session to a subscriber profile. This information can be sent to session manager 436 through module communication 442, which may be implemented in any combination of hardware or software. IPSG manager 434 can setup one or more RADIUS UDP flows 428 corresponding to the UDP port numbers used by the access gateway 414 when communicating to a RADIUS accounting server 418.

IPSG manager 434 functions in at least two modes relating to the handling of RADIUS accounting messages received from access equipment. In some embodiments, IPSG manager 434 is in a server mode. In server mode, the RADIUS accounting messages are addressed to gateway 416 and IPSG manager 434 issues RADIUS accounting responses 444, with gateway 416 implementing a RADIUS server. In other embodiments, IPSG manager 434 is in an inspect mode and the messages are not addressed to the gateway, so the messages are directed to the IPSG manager 434 by NPU 426. At IPSG manager 434, the messages are inspected and information is extracted before the message is forwarded 446. In both modes, the messages are inspected and information is extracted and sent to session manager 436. IPSG manager 434 can inspect RADIUS accounting start and stop messages to activate and deactivate sessions by way of communication module 442. The IPSG manager 434 can also deliver a stripped copy of the original RADIUS packet to any in-line service that uses accounting information for charging purposes. In certain embodiments, session manager 436 can modify the packet flows inserting charging information with the packets while a CSS API 440 directs the packets through in-line services and then strips this information afterwards.

Session manager 436 can create at least two IP data flows 430 and 432. Ingress IP data flow 430 indicates to session manager 436 that the packet is coming from mobile node 410 so that session manager 436 can direct the packet to the corresponding functions or servers for processing the packet in accordance with the services in the subscriber profile. When a packet arrives at egress IP data flow 432, a similar process takes place. Egress IP data flow 432, like ingress IP data flow 430, recognizes packets on a subscriber session basis and forwards the packets to session manager 436 for service processing in accordance with the subscriber profile. Session manager 436 may add additional IP data flow modules per session if other services such as tunneling are applied to the session on the egress side, for example. When a new session is activated and session manager 436 receives the extracted information from IPSG manager 434, session manager 436 can authenticate the call to load the subscriber profile. The authentication can involve the NAI, the MSID, the user name and password, or any other authentication attribute of mobile node 410. The subscriber profile includes configuration information such as the subscriber access control list (ACL), the corresponding CSS redirections, and other services applied for this subscriber. When the call is authenticated or authorized, then the routing on a per-session basis is setup and data flow begins.

The subscriber ACL is a set of rules associated with a subscriber, such as which services are to be performed on packets. The subscriber ACL can be processed in software by session manager 436 that process the packet flow for the subscriber session. In some embodiments, the subscriber ACL is bound to one or more in-line services and CSS API 440 is used to direct packet to and from the in-line services, which can include external servers. CSS API 440 is a module that defines how packet flows are handled by the gateway based on the content of the packets, which includes information in a packet header. The content service steering (CSS) API 440 includes features such as load balancing, network address translation (NAT), HTTP redirection, and DNS redirection. In some embodiments, the CSS API 440 uses information obtained from the subscriber profile to both select appropriate content service providers (e.g., the in-line service or external content server) and route the packet flows in a load balanced fashion. The load balancing can be accomplished by a number of algorithms such as round robin, least loaded, destination hashing, and normalized response time monitoring. The CSS API 440 can also monitor the health of external servers through internet control message protocol (ICMP), hypertext transfer protocol (HTTP), transfer control protocol (TCP), and file transfer protocol (FTP) keepalive mechanisms. By monitoring the health of external servers, the CSS API 440 can redirect packet flows if an external server fails.

Figure 5:
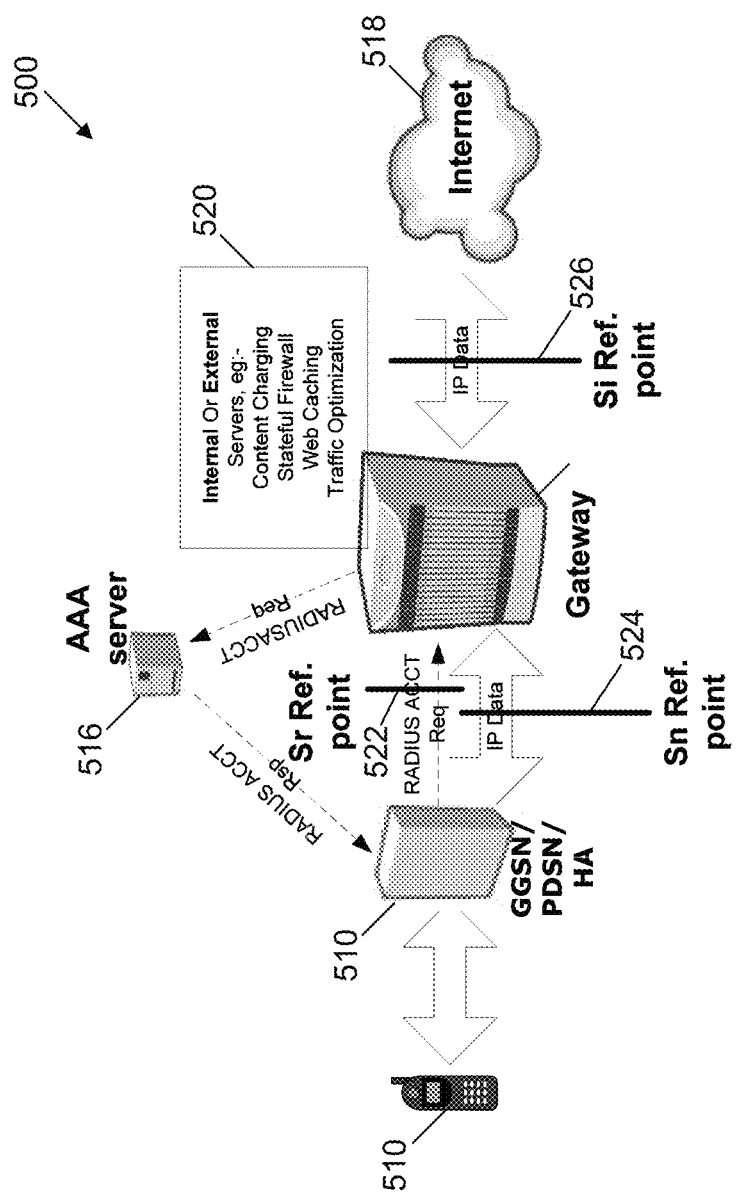
FIG. 5 is a block diagram of a network topology with packet flows in accordance with certain embodiments.

FIG. 5 illustrates a network topology 500 with packet flow in accordance with certain embodiments. Network topology 500 includes mobile node 510, access gateway 512, gateway 514, authentication, authorization, and accounting (AAA) server 516, internet 518, and internal or external servers 520. Access gateway 512 can be a Gateway GPRS Support Node (GGSN), a packet data serving node (PDSN), a home agent (HA), packet data inter-working function (PDIF), an access service network gateway (ASNGW), or a user plane entity (UPE). As shown, packet flows being sent and received by gateway 514 are inspected. RADIUS accounting messages are inspected at a Sr reference point 522, which can be implemented with a flow module in a processing unit of gateway 514, such as RADIUS UDP flow (428 in FIG. 4). IP data flows are also inspected at Sn reference point 524 and Si reference point 526. These IP data flows can be implemented with flows in the processing unit of gateway 514 such as Ingress IP data flow 430 and egress IP data flow 432 (both shown in FIG. 4).

Figure 6:
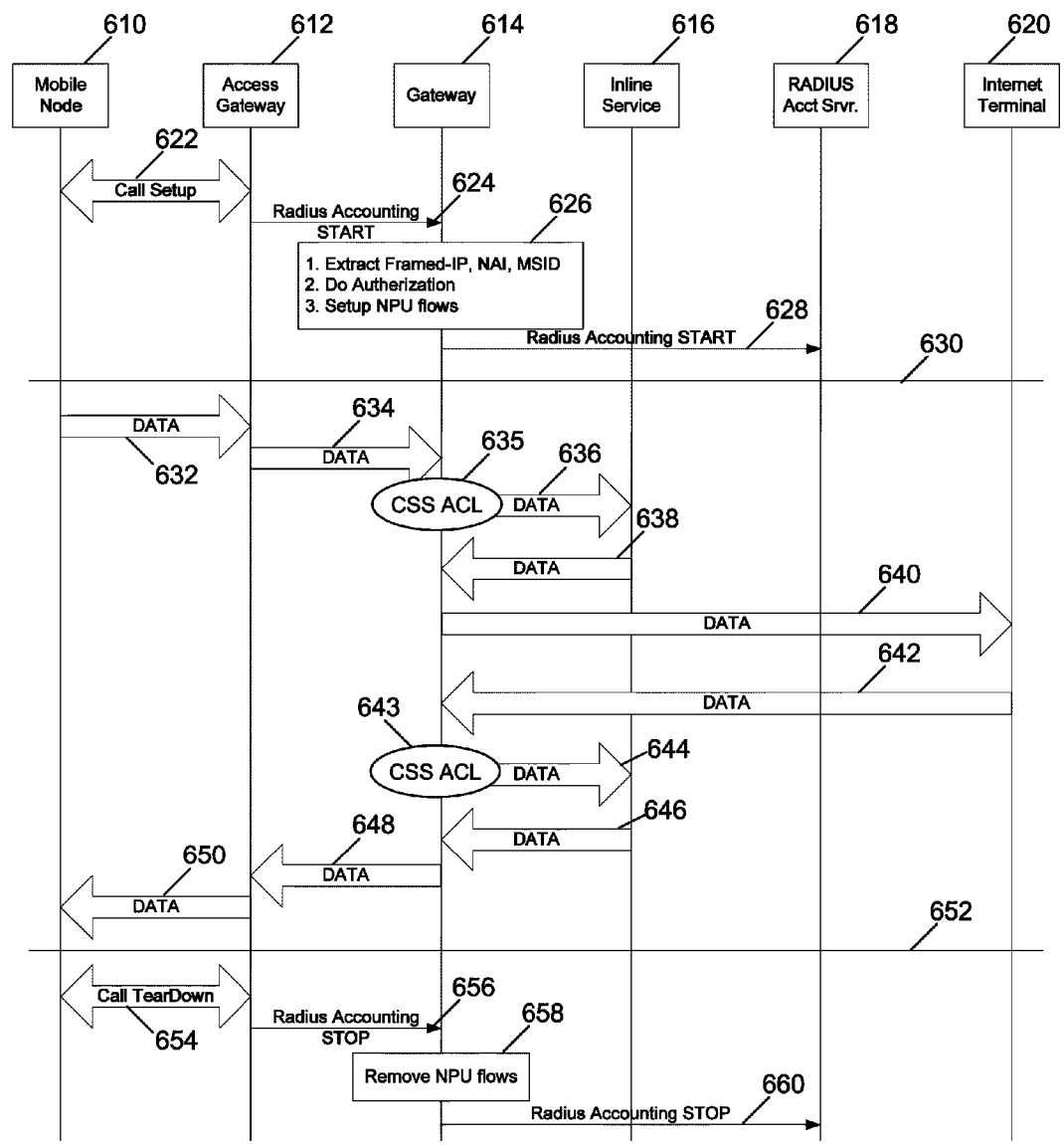
FIG. 6 is a signaling diagram of signaling flow for in-line services with an external RADIUS server in accordance with certain embodiments.

FIG. 6 illustrates signaling flow among network devices in accordance with certain embodiments. The network devices include mobile node 610, access gateway 612, gateway 614, in-line service 616, RADIUS accounting server 618, and internet terminal 620. Mobile node 610 contacts access gateway 612 when a session is to be setup. Call or session setup 622 proceeds with messages being exchanged to setup a link between the devices. Access gateway uses information obtained from call setup 622 to send a RADIUS accounting start message 624 to gateway 614. Gateway 614 performs an inspection on the packet and extracts information in 626. This can include extracting a framed-IP address, the NAI, and the MSID, performing authorization to obtain the subscriber profile, and setting up IP flows. Gateway 614 forwards RADIUS accounting start message 628 to RADIUS accounting server 618.

After some time passes 630, packet flows can be seen. Mobile node 610 sends packets 632 to access gateway 612. Packets 632 can include instructions, requests, or data such as email, multimedia content, or information for coordinating multiplayer gaming, for example. Access gateway 612 forwards the packets 634 to gateway 614. At gateway 614, the packets 636 pass through an IP flow (not shown) and are directed to in-line service 616 by a content service steering (CSS) access control list (ACL) 635. CSS ACL 635 can be implemented in the CSS API (440 in FIG. 4) in some embodiments. Processing occurs on packets 636 and in-line service 616 sends packets 638 to gateway 614 for further routing. Gateway 614 sends packets 640 to internet terminal 620. Internet terminal 620 also sends packets 642 for routing to mobile node 610. Packets 642 arrive at gateway 614 where the packets pass through an IP flow (not shown) and are directed to in-line service 616 by CSS ACL 643. Packets 644 received by in-line service 616 are processed according to the services included in the subscriber profile and packets 646 are sent to gateway 614. Gateway directs packets 648 to access gateway 612, which sends packets 650 to mobile node 610.

After some time 652, mobile node contacts access gateway 612 to tear down the session. Call teardown messaging 654 is initiated to end the session. Access gateway 612 sends a RADIUS accounting stop message 656 to gateway 614. When the RADIUS accounting message is received at gateway 614, an IPSG manager (434 in FIG. 4) inspects the message and contacts session manager (436 in FIG. 4) so that flow can be removed 658 and other resources reallocated. Gateway 614 forwards RADIUS accounting stop 660 to RADIUS accounting server 618.

Figure 7:
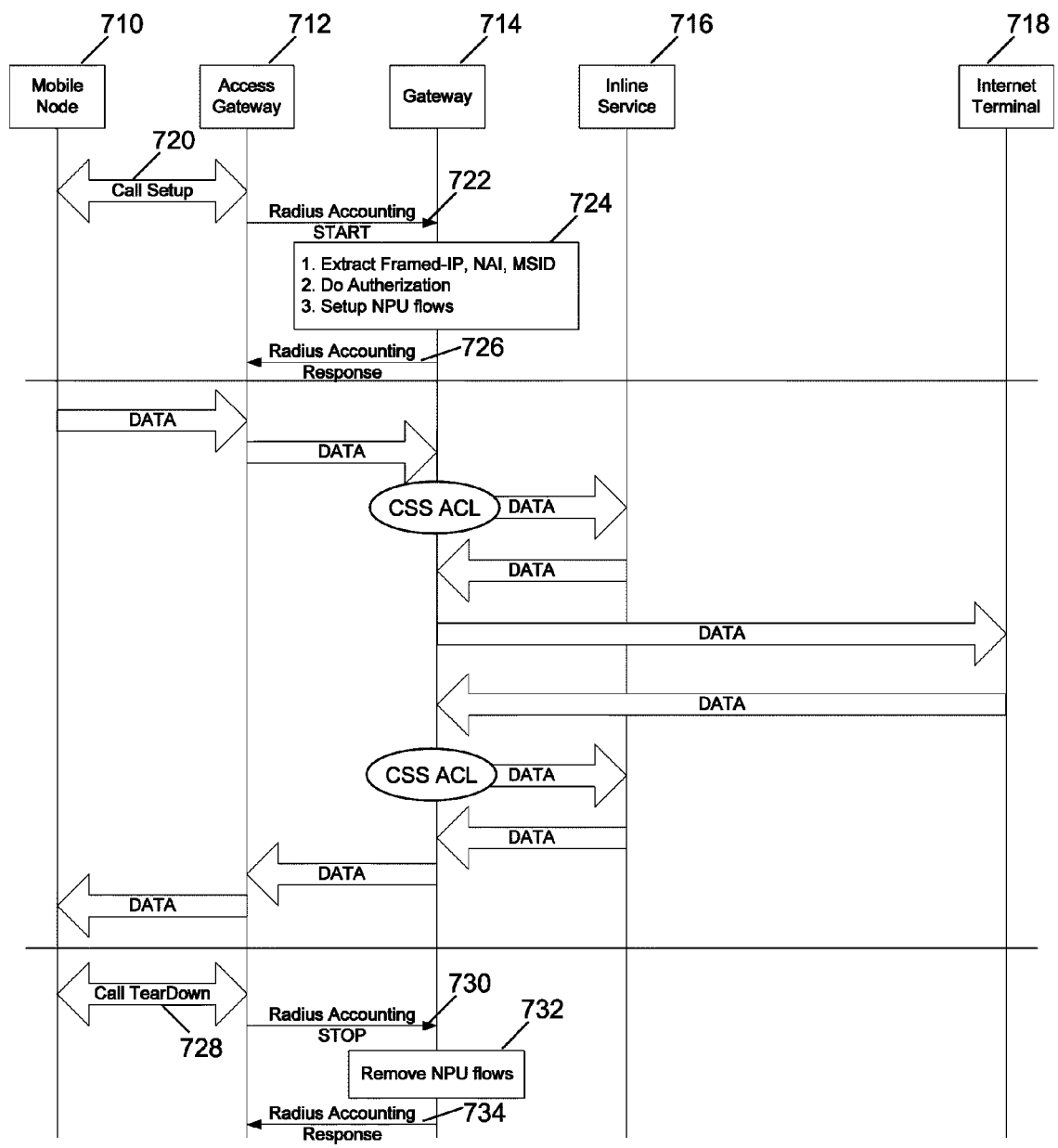
FIG. 7 is a signaling diagram of signaling flow for in-line services in RADIUS-server mode in accordance with certain embodiments.

FIG. 7 illustrates signaling flow among network devices where a RADIUS server is implemented internally in accordance with certain embodiments. The network devices include mobile node 710, access gateway 712, gateway 714, in-line service 716, and internet terminal 718. When setting up a session, mobile node 710 contacts access gateway 712 and initiates a call setup where information is exchanged to enable the session to be setup. Access gateway 712 can send a RADIUS accounting start message 722 to gateway 714. Gateway 714 inspects RADIUS accounting start message 722 and extracts information. Session setup at gateway 714 in 724 includes extracting a framed-IP address, performing authorization, and setting up flows to check for packets and direct the packets accordingly. Gateway 714 implements a RADIUS server in part and sends a RADIUS accounting response 726 to access gateway 712. In some embodiments, RADIUS accounting messages can be sent from access gateway 712 directly to gateway 714 or the RADIUS accounting messages can be sent indirectly through another RADIUS proxy (not shown).

When the session is to end, mobile node 710 initiates call teardown messaging 728 with access gateway 712. Access gateway 712 sends a RADIUS accounting stop message to gateway 714. The gateway uses this information to free up resources used in servicing the session, such as maintaining flows to direct the packets on a per-subscriber basis. When the accounting has been completed and the resources freed, gateway 714 sends a RADIUS accounting response message 734 to access gateway 712.

Figure 8:
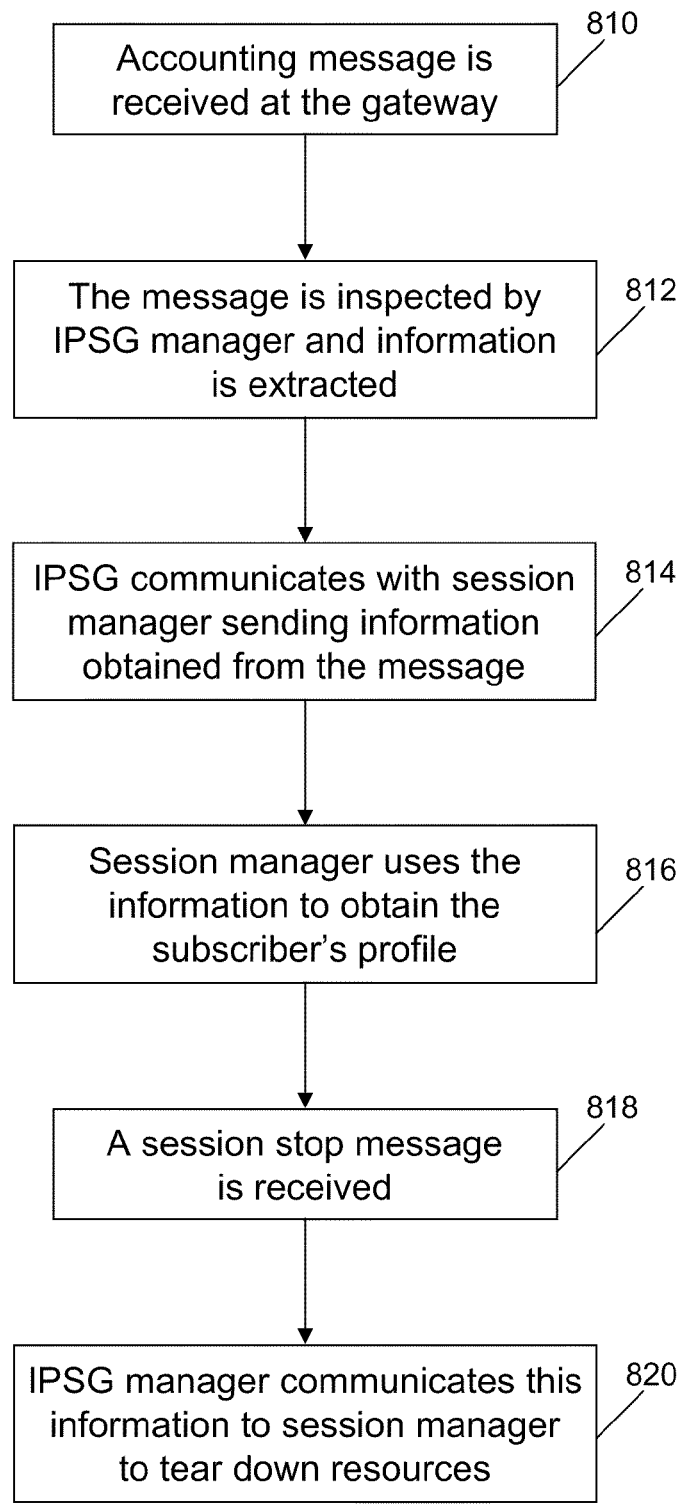
FIG. 8 is a flow diagram relating to providing in-line services in accordance with certain embodiments.

FIG. 8 illustrates a flow diagram of an implementation for providing subscriber based services in accordance with certain embodiments. At step 810, an accounting message is received at the gateway. The accounting message can be a RADIUS accounting message, a DIAMETER accounting message, a GPRS tunneling protocol (GTS) messaging, a mobile IP (MIP) messaging, or any other applicable messaging from which information can be extracted in order to start and stop sessions. The gateway can use software that checks packets meeting certain criteria and sends these packets on for further inspection. In step 812, the message is inspected by an IPSG manager and information is extracted. The IPSG manager can be a software task that is running in the gateway that checks messages, extracts information to obtain a subscriber profile or other characteristics, and activates a session on the gateway. The IPSG manager extracts the mobile node's IP address, the NAI, the IMSI/MSID, and other information from the signaling protocol used, in some embodiments. The inspection may include a determination as to whether information needs to be extracted, or if the information or portions of the information are already cached. In step 814, the IPSG communicates with a session manager and sends the information obtained from the message. The session manager can be a task running in the gateway. Session manager uses the information received from the IPSG manager, in step 816, to obtain the subscriber's profile. The subscriber's profile includes information relating to the services that the packet flow receives. This information can be used to route the packet flow through the selected services. In step 818, a session stop message is received by the IPSG manager in the gateway. The IPSG manager communicates this information to the session manager so that the flows can be torn down and the resources released, in step 820.

Figure 9:
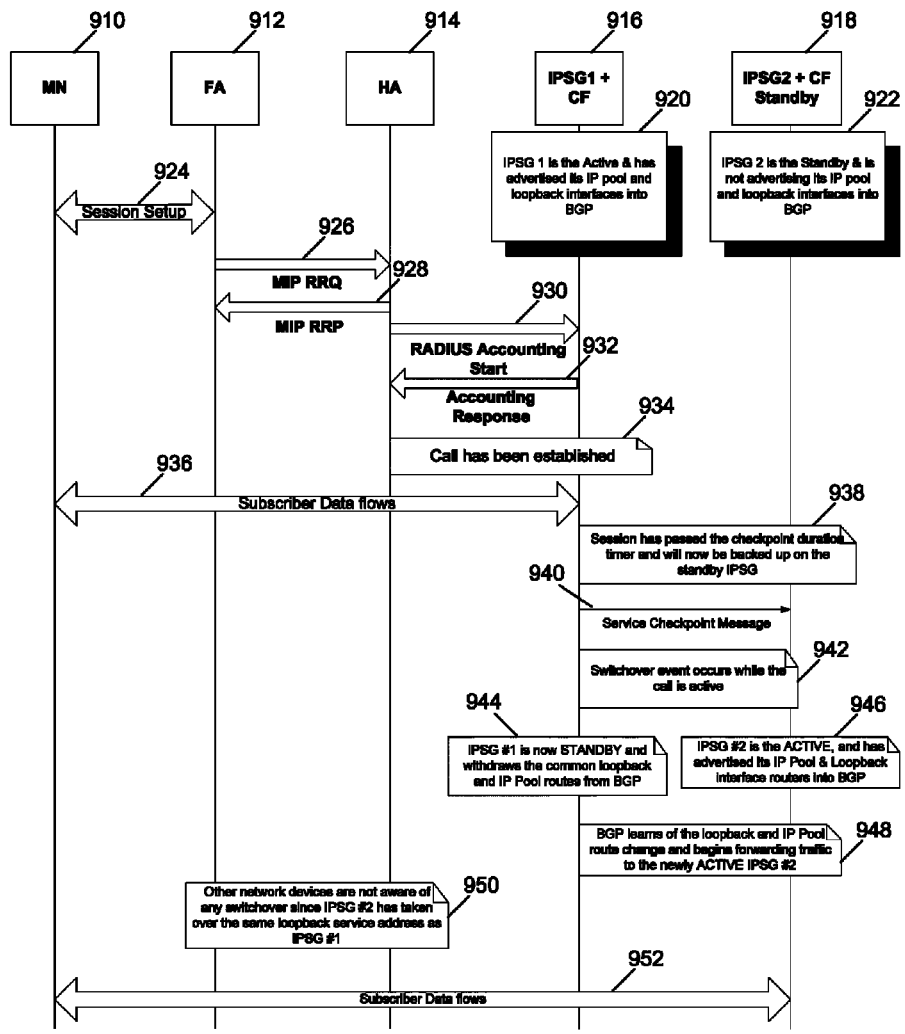
FIG. 9 is a signaling diagram relating to geographic redundancy of in-line services in accordance with certain embodiments.

FIG. 9 illustrates inter-gateway redundancy in accordance with some embodiments. The network devices shown in FIG. 9 include mobile node (MN) 910, foreign agent (FA) 912, home agent (HA) 914, IP services gateway (IPSG) 916, and IPSG 2 918. The two gateways 916 and 918 can implement active geographic redundancy as described in U.S. patent application Ser. No. 11/731,920 entitled "System and Method for Active Geographic Redundancy," which is hereby incorporated by reference herein in its entirety. IPSG 1 916 is in an active mode and has advertised its IP pool and loopback interfaces into the border gateway protocol in 920. In 922, IPSG 2 918 is in standby and is mirroring the information regarding the sessions in IPSG 1 916 so if anything happens, IPSG 2 918 can seamlessly recover. Mobile node 910 initiates call setup messaging 924 with foreign agent 912. Foreign agent 912 sends a mobile IP (MIP) registration request (RRQ) 926 to home agent 914. Home agent sends a MIP registration reply (RRP) 928 to setup a connection between foreign agent 912 and home agent 914. Home agent 914 sends a RADIUS accounting start message 930 to continue in setting up the session, which passes through IPSG 1 916.

IPSG 1 916 inspects and sets up the session as described above in various embodiments and sends an accounting response 932. At 934, a session is established and packet flow between mobile node 910 and IPSG 1 916 begins. A timer can be used to periodically trigger backup of IPSG 2 918 with information that would be used to seamlessly pickup the sessions running in IPSG 1 916 at 938. A service checkpoint message 940 is sent from IPSG 1 916 to IPSG 2 918 to pass information in case of a failure. At some point, a switchover event 942 occurs and IPSG 1 916 goes into a standby state 944 and IPSG 2 918 goes into an active state 946. The active state of IPSG 2 918 causes the IPSG to advertise its IP pool and loopback interface router into the border gateway protocol and IPSG 2 918 uses the same information as IPSG 1 used, so other network devices are unaware of the change, but information is routed to IPSG 2 918. Also since IPSG 2 918 received information regarding the sessions in the service checkpoint message, it is ready to handle the packet flows in the same manner as IPSG 1 916. At 948, the BGP router begins routing the information to IPSG 2 918, but other network devices are unaware of the change at 950. Packet data then flows from mobile node 910 to IPSG 2 918 in 952. In some embodiments, gateways 916 and 918 can be implemented as a packet data serving node (PDSN), a Gateway General packet radio service Support Node (GGSN), a serving GPRS support node (SGSN), a packet data inter-working function (PDIF), an access service network gateway (AS-NGW), a base station, a access network, or a User Plane Entity (UPE).

Figure 10:
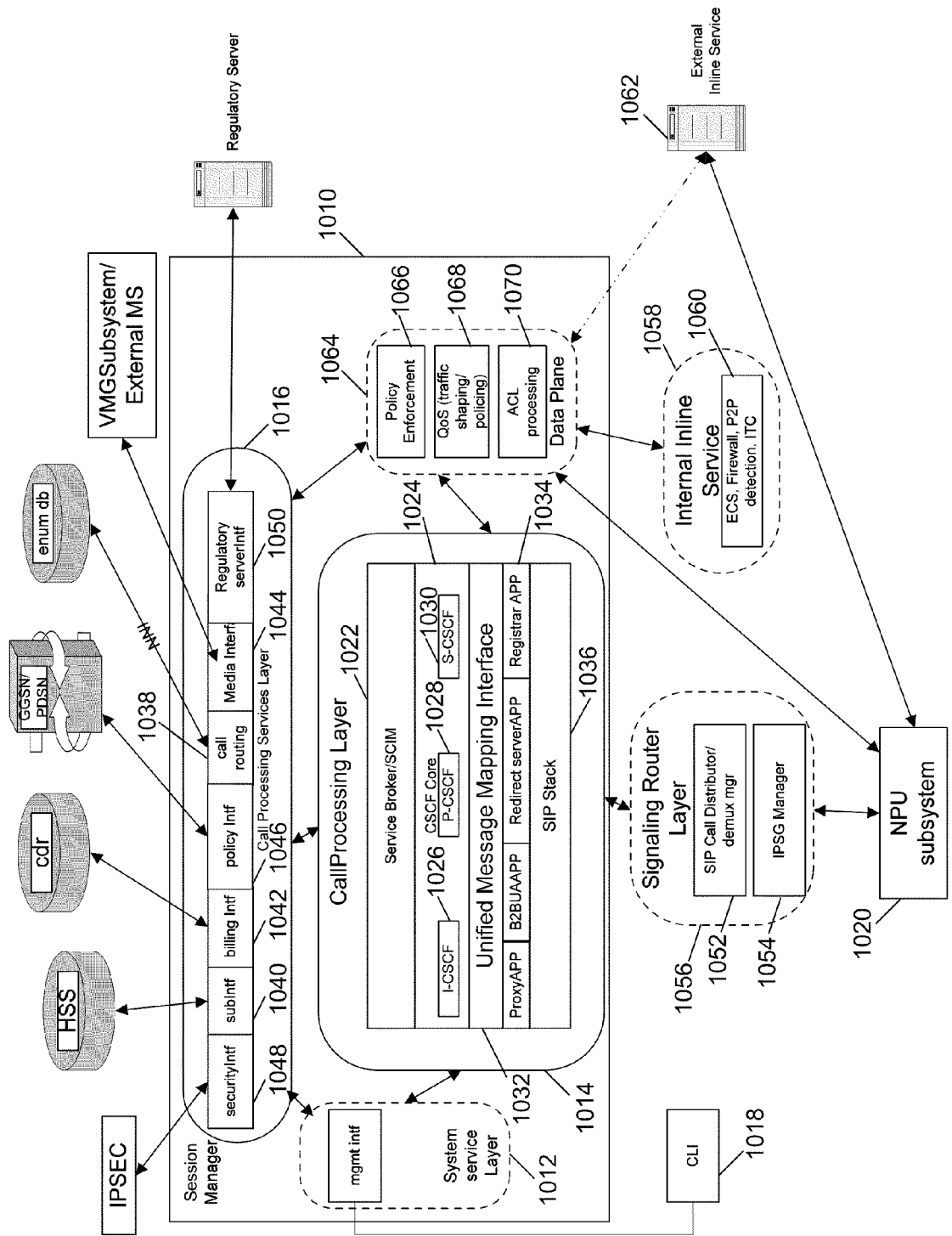
FIG. 10 is a logical block diagram of software in a gateway in accordance with certain embodiments.

FIG. 10 illustrates a control plane architecture for a gateway that is in-line service capable in accordance with certain embodiments. A session manager 1010 services and processes user session data flow for user equipment/mobile subscribers. Session manager 1010, which is the same session manager as described above, includes functional layers such as a system service layer 1012, a call processing layer 1014 and a call processing support services layer 1016. The system services layer 1012 provides an interface for instructions to be passed to the session manager and the other layers. A command line interface (CLI) 1018 as well as network processing unit 1020 interface are included. The call processing layer 1014 includes a service broker/ Service Control Interaction Manager (SCIM) 1022, a CSCF core 1024 that includes an I-CSCF 1026, P-CSCF 1028, and S-CSCF 1030, a unified message mapping interface 1032, applications 1034, and a SIP stack 1036. In some embodiments, the CSCF core includes one of the CSCF functionalities, for example, the P-CSCF. The call processing support services layer 1016 includes a variety of services such as routing and address translation service 1038, subscriber management service 1040, changing interface service 1042, media interface service 1044, QoS policy interface service 1046, security interface 1048, and regulatory server interface 1050.

Looking at the call processing layer 1014, this layer includes signaling protocols and call control using universal SIP as an application program interface (API). The signaling protocols can be SIP or can be other protocols like ISUP, MGCP, or H.323. Further, the call processing layer 1014 allows interworking between SIP variants and other protocols through a unified mapping interface. The unified mapping interface can convert protocol specific messages and parameters to the universal SIP like API format. SIP like messaging is used, in some embodiments, because SIP has the largest message set and can cover the possible messaging scenarios for SIP and the other protocols. The call processing layer 1014 can also provide transparency to data that need not be processed by the CSCF core by placing that information into an envelope. Parameters that are not of interest can be placed in an envelope and remain unmodified. The CSCF core allows any text string as the calling and called number, the number does not need to be restricted to an E.164 number. The number could be, for example, an Address of Record (AoR) or any name string with a domain name.

A demux manager 1052 and an IPSG manager 1054 both reside in the signal routing layer 1056, as shown in FIG. 10. The signal routing later 1056 with the demux manager can determine where a packet flow is sent for processing. The packet flow can be sent to a process instance for further processing and/or signal handling. IPSG manager 1054, as described above, can inspect accounting messages to create new sessions, cache information, and direct packet flows through inline services. The IPSG manager is a type of demux manager. A flow (not shown) can be setup in NPU subsystem 1020 to direct accounting messages to IPSG manager 1054 for inspection. IPSG 1056 communicates with session manager 1010 to setup a new session, which can include one or more flows being setup in NPU subsystem to direct packet flows for a particular subscriber.

Internal inline service 1058 can include one or more services 1060 such as enhanced charging services, firewall protection, peer to peer detection, and intelligent traffic control (ITC). In some embodiments, internal inline service 1058 is provided on the same gateway as session manager 1010, NPU subsystem 1020 and signaling router layer 1056. External inline service 1062 can also be used in providing services to a packet flow. External inline service 1062 can be legacy equipment maintained by a service provider or services provided by another network device.

A data plane 1064 is provided in some embodiments to handle packet flows through the gateway. The data place 1064 performs processing (for example, policy enforcement, ACL, and QoS) on packet flows for a subscriber. Data plane 1064 can include policy enforcement 1066, QoS enforcement 1068, and access control list (ACL) processing 1070. Policy enforcement 1066 can provide execution of rules or other policies on packet flows. For example, a security policy can be implemented which does not allow unauthorized packets to be sent to a mobile node. QoS enforcement 1068 provides traffic shaping and enforcement of limits or minimum levels of service. QoS enforcement can limit the amount of sessions being handled by a gateway based on the levels of service demanded by each subscriber. In certain embodiments, subscribers may not be using the full extent of their QoS level at the moment, but because the subscriber is guaranteed a minimum bandwidth, that bandwidth is reserved. ACL processing 1070 provides services such as 1060 or 1062 with information on how to process data. For example, a subscriber ACL can be used to setup services and sessions, while a context ACL or a device level ACL may provide more general and universal processing information and/or rules.

Figure 11:
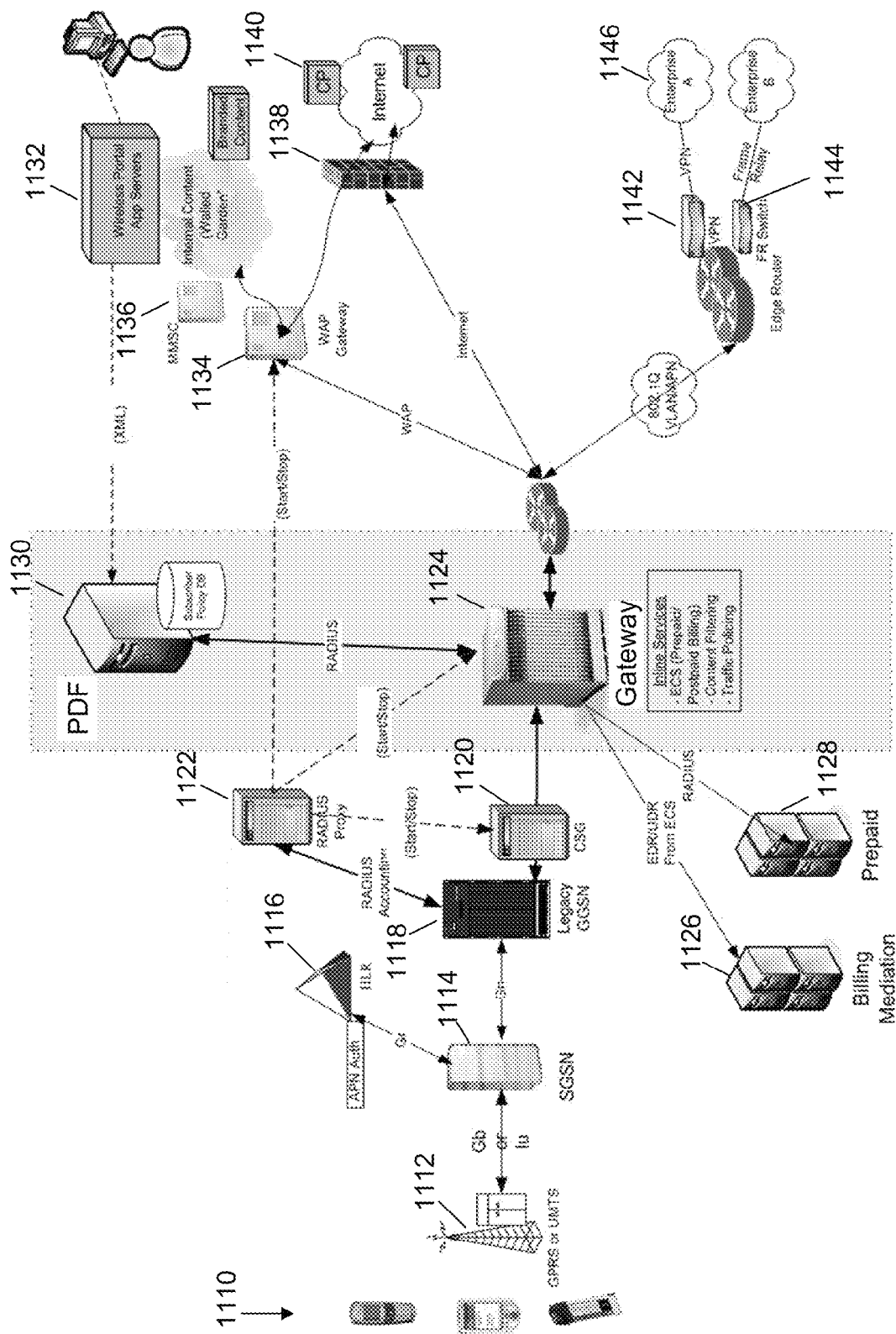
FIG. 11 is block diagram of various network devices with which the gateway communicates.

FIG. 11 illustrates policy server and gateway interactions in accordance with certain embodiments. FIG. 11 includes mobile nodes 1110, radio access network (RAN) equipment 1112, a SGSN 1114, a home location register 1116, a legacy GGSN 1118, a content selection gateway (CSG) 1120, a RADIUS proxy 1122, a gateway 1124, billing mediation servers 1126, prepaid servers 1128, a policy decision function (PDF) 1130, wireless portal application servers 1132, a wireless application protocol (WAP) gateway, a multimedia messaging service center 1136, a firewall, a content provider (CP), a virtual private network (VPN) private branch exchange (PBX), a frame relay (FR) switch 1144, and an enterprise network 1146. As shown, gateway 1124 can interact with billing mediation servers 1126, which provide collection, aggregation, and conversion of call detail records (CDR) and usage detail records (UDR) for service provider billing systems (not shown). Gateway 1124 also supports prepaid billing, as shown with interaction with prepaid billing servers 1128. Gateway 1124 can provide services on a per-subscriber basis within a prepaid calling environment. For example, a user can select parental controls for a child's mobile node, which is a prepaid mobile node.

Gateway 1124 also interacts with PDF 1130 to determine the policies governing the session. Gateway 1124 upon determining information from the accounting messages can obtain subscriber profile information from a database maintained at PDF 1130. In some embodiments, the PDF 1130 and subscriber database may be implemented within gateway 1124. Other information, such as QoS information can be obtained from PDF 1130 for use in setting up the flows and services at gateway 1124. As shown, PDF 1130 and RAIUS proxy 1122 can be in communication with wireless portal application servers 1132 and WAP gateway 1134 to provide access to certain kinds of content in a session. Gateway 1124 may also receive content from content providers 1140 over the internet. Enterprise networks such as 1146 may also interconnect with gateway 1124 to provide enterprise services over a service provider's network to mobile nodes 1110. Gateway 1124 can setup flows to provide enterprise services to mobile nodes because the gateway is subscriber aware and can uniquely process each flow.

In some embodiments, the interface between the policy server 1130 and gateway 1124 is setup as specified by the Ty interface. As described above, gateway 1124 determines when to create a new session by parsing the radius accounting messages. Before creating the session, gateway 1124 may generate an access request message to the configured accounting server (e.g., RADIUS proxy 1122) or policy server 1130 for authorizing or authenticating the session. The subscriber identification parameters may be mobile station integrated services digital network (MSISDN) number, international mobile subscriber identity (IMSI), network access identifier (NAI) (or username), framed-IP-address, or any other applicable identification. Once radius proxy 1122 or policy server 1130 successfully authenticate or authorize the session, an access accept message with various attributes to be applied to the subscriber session is returned. The attributes may include an ACL (access control list) name, the content based charging policies rule base name, the filter id, and/or various subscriber rate-limit attributes. When gateway 1124 receives the access accept message, the attributes can be applied to the subscriber session. In certain embodiments, the attributes are used to create or load a subscriber ACL and the attributes may be cached for later use.

Figure 12:
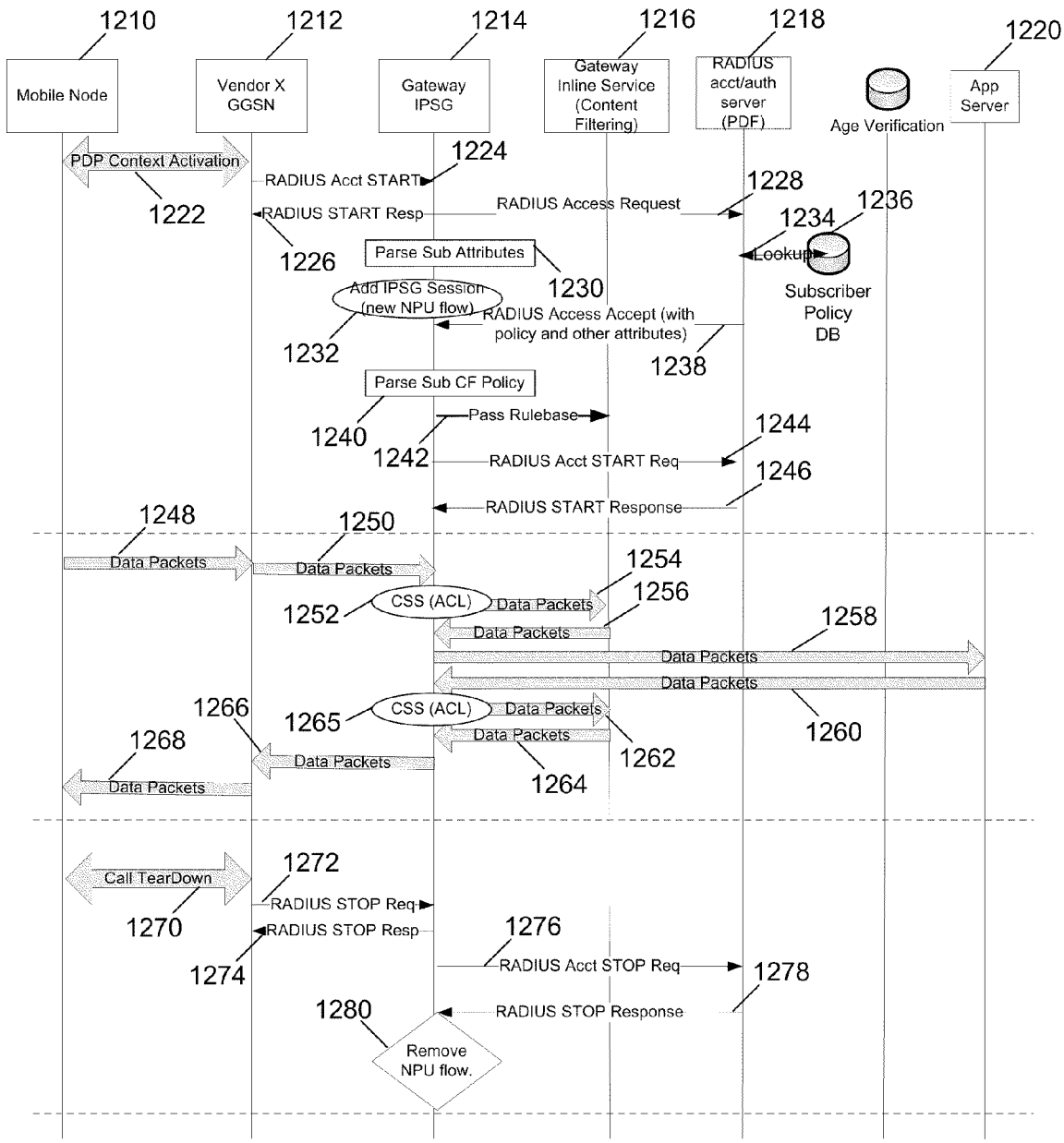
FIG. 12 is signaling diagram including messaging to a policy server in accordance with certain embodiments.

FIG. 12 illustrates a signaling flow including interaction with a policy server in accordance with certain embodiments. FIG. 12 includes a mobile node 1210, a GGSN 1212, a gateway IPSG 1214, a gateway inline service 1216, a RADIUS auth/acct server 1218, and an application server 1220. A packet data protocol (PDP) context activation 1222 is sent from mobile node 1210 to GGSN 1212. GGSN 1212 sends a RADIUS account start message 1224 to gateway IPSG 1214. Gateway IPSG 1214 sends a RADIUS start response message 1226 to GGSN 1212. Gateway IPSG 1214 takes the attributes included in the RADIUS account start message and uses those attributes to create a RADIUS access request message 1228 which is sent to RADIUS auth/acct server 1218 to authenticate or authorize the session. In some embodiments, RADIUS auth/acct server 1218 can be implemented as a non-standard policy decision function (PDF) that works with RADIUS messaging and allows RADIUS CoA mechanisms to control the subscriber. Gateway IPSG 1214 parses attributes 1230 of RADIUS account start message to begin setup of a new session and associated flows 1232 to direct the packet flow of the session. The flow 1232 is setup in the network processing unit, in some embodiments, as described above.

A lookup 1234 occurs in a subscriber policy database 1236 to send a RADIUS access accept message 1238 to gateway IPSG 1214. RADIUS access accept message 1238 includes policy information and other attributes. The gateway IPSG 1214 parses the policy information and attributes 1240 to both obtain information that can be used to setup services (such as content filtering), but also to load any subscriber access control list information. From the parsing of policy information and attributes 1240, a rulebase is passed to gateway inline service 1216. As shown in this example, a service of content filtering is provided in-line. By passing the rulebase the service can function as selected by the user. A RADIUS account start request message 1244 is sent to a RADIUS auth/acct server 1218, which sends a RADIUS start response back to gateway IPSG 1214.

A packet flow 1248 begins at mobile node 1210. This packet flow can include content or requests for content, such as videos, games, news, internet access, chat, voice over IP (VoIP), location-based services, email, or any other type of data or multimedia content. The packet flow 1250 is sent from GGSN 1212 to gateway IPSG 1214. At gateway IPSG 1214 a flow (not shown) can identify the session corresponding to packet flow 1254 for application of content service steering (CSS) from an access control list 1252. The CSS within gateway IPSG 1214 routes packet flow 1254 to gateway inline service 1216. At gateway inline service 1216 content filtering is performed on the data or requested data. The processed packet flow 1256 is sent back to gateway IPSG 1214 for further routing. Packet flow 1258 is sent to application server 1220. Application server can fulfill a request, provide data, or otherwise act based on packet flow 1258. For example, in a gaming situation, input and output of data can occur at application server 1220. Packet flow 1260 is sent from application server 1220 to gateway IPSG 1214. Again, a flow (not shown) determines the corresponding session and CSS ACL 1265 sends packet flow 1262 to gateway inline service 1216 for processing. Gateway inline service 1216 sends packet flow 1264 to gateway IPSG 1214 for routing. Packet flow 1266 is sent to GGSN 1212 and then packet flow 1268 is sent to mobile node 1210.

At some point in time, the user of mobile node 1210 terminates the session. Call teardown 1270 occurs to free the radio resources and end the session. GGSN 1212 sends a RADIUS stop request 1272 to gateway 1214 to terminate the session. Gateway IPSG 1214 sends a RADIUS stop response 1274 to GGSN 1212 to indicate the acknowledge the message. Gateway IPSG 1214 sends a RADIUS account stop request 1276 to PDF 1218 to advise that the session has been terminated. A RADIUS stop response 1278 is sent back from PDF 1218 and gateway IPSG 1214 removes the flow(s) 1280 associated with the session.

In some embodiments, a RADIUS access request message and a RADIUS accounting start message can include one or more of the following attributes: user-name, user-password, NAS-IP-address, service-type, framed-IP-address, filter-ID, calling-station-ID, NAS-identifier, state, proxy-state, acct-session-ID, event-timestamp, 3GPP2-correlation-ID, 3GPP-IMSI, 3GPP-NSAPI, and error-cause. In certain embodiments, an access accept message can include one or more of the following attributes: service-type, filter-ID, state, proxy-state, event-timestamp, and SN1-rulebase.

Figure 13:
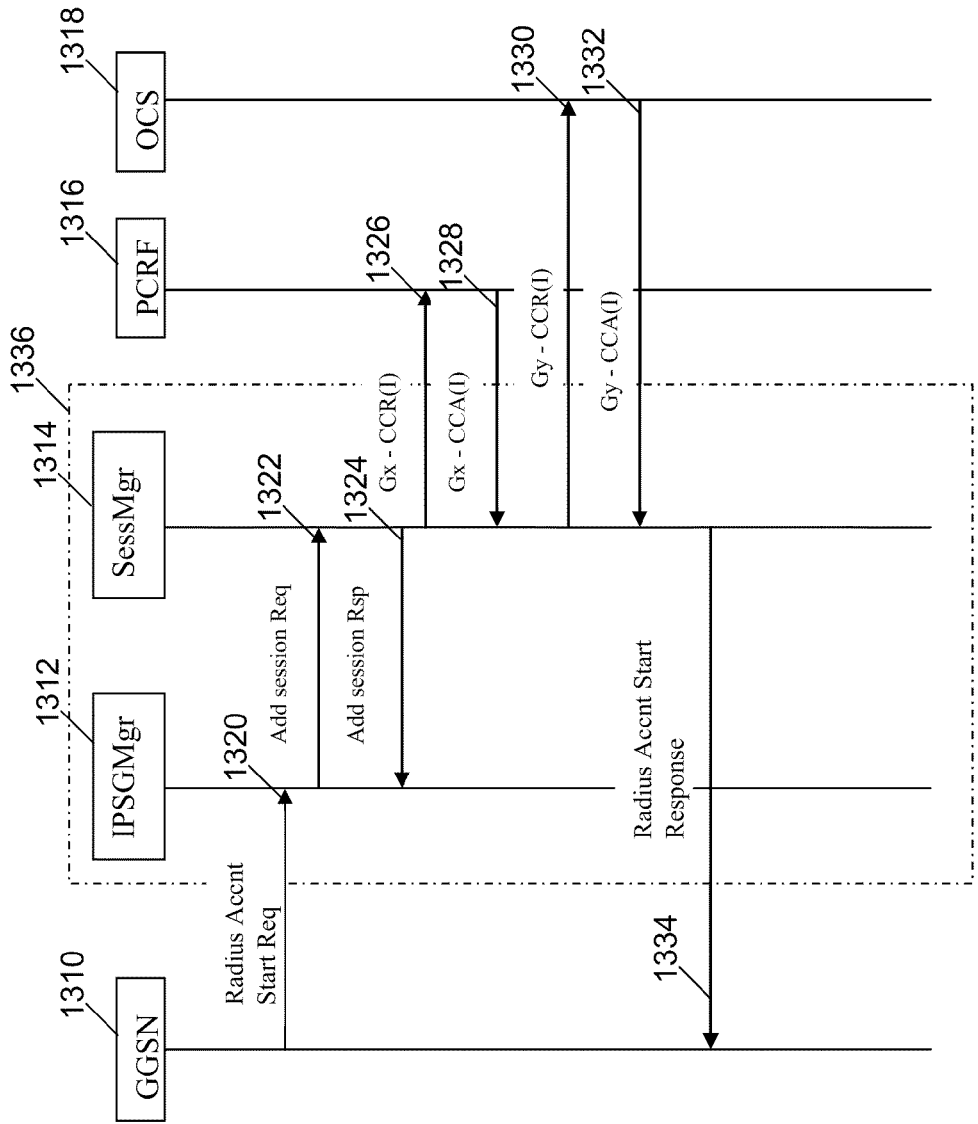
FIG. 13 is signaling diagram relating to prepaid messaging in accordance with certain embodiments.

FIG. 13 shows prepaid signal flow in accordance with certain embodiments. FIG. 13 includes a GGSN 1310, an IPSG manager 1312, a session manager 1314, a policy and charging rules function (PCRF) 1316, and an online charging system (OCS) 1318. As shown, GGSN 1310 sends a RADIUS account start request 1320 to IPSG manager 1312. IPSG manager 1312 parses the accounting start request message and sends an add session request 1322 to session manager 1314. Session manager 1314 sends an add session response message 1324. Session manager 1314 sends a credit control request (CCR) 1326 to PCRF 1316. PCRF 1316 sends a credit control answer (CCA) 1328 in response. Session manager 1314 also sends a CCR 1330 to OCS 1318. OCS 1318 sends a CCA in response. Session manager 1314 delays sending an accounting start response 1334 until command code signaling for prepaid (CCR/CCA) is completed. In some prepaid calling embodiments, the RADIUS accounting start response should not be sent until the session is successfully established at the IPSG gateway (1336). For a Gx with Gy enabled session, the accounting start response 1334 is sent after the CCR/CCA messaging has been exchanged with PCRF 1316 and OCS 1318. Prepaid sessions may involve additional authentication or authorization, which can cause delay in setup. Further, the prepaid session includes verifying enough credits exist for the session to be setup. As one practiced in the field would appreciate, other prepaid setups may be used.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Support Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The features of a chassis that implements an enterprise access gateway, in accordance with some embodiments, are further described below. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit (NPU). The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit.

The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing embodiments, it is understood that the present disclosure has been made only by way of example, and that numerous changes in the details of implementation of the invention may be made without departing from the spirit and scope of the invention, which is limited only by the claims which follow.

We claim:

1. A gateway comprising:
an interface configured to transmit and receive data;
a memory configured to store subscriber profile information and software for providing services to mobile nodes;
an IP services gateway (IPSG) manager that is configured to activate sessions for mobile nodes based on incoming packets received at the interface, and to obtain information from the received packets in order to link the received packets to a subscriber profile associated with a mobile node and to set up provision of at least one service to the received packets;
a session manager that is configured to obtain the subscriber profile information based on information received from the IPSG, to recognize the received packets on a subscriber session basis, and to direct the received packets to corresponding functions or servers for processing the packets in accordance with services specified in the subscriber profile information, the session manager configured to manage the provision of a single service and configured to manage the provision of multiple services to packets; and
a network processing unit (NPU) that is configured to direct the received packets to the session manager so services can be provided to the received packets.

2. The gateway of claim 1, wherein the IPSG manager is configured to inspect signaling protocol messages received from the mobile node that meet certain criteria and extract mobile node identifying information to obtain the subscriber profile.

3. The gateway of claim 1, wherein the subscriber profile information includes configuration information regarding services to be applied for the mobile node and a subscriber access control list (ACL), wherein the information regarding service includes information to route the packet flow through selected services.

4. The gateway of claim 1, wherein the IPSG manager obtains at least identification information that is used to authenticate a session for the mobile node, set up the session, and link the session to the subscriber profile.

5. The gateway of claim 1, further comprising an enhanced charging in-line service that is configured to process packets for a particular subscriber based on the subscriber profile.

6. The gateway of claim 1, wherein the IPSG manager is configured to receive packets from the NPU based on information in the packets and the IPSG manager inspects the packets received from the NPU.

7. The gateway of claim 1, wherein the session manager is configured to manage policy communication with a policy server to receive policy information and a charging server to report charging information for accounting purposes.

8. The gateway of claim 1, wherein the gateway includes a serving general packet radio service support node (SGSN).

9. A method comprising:
receiving packets at an IP services gateway (IPSG) manager;
inspecting the packets and determining from the packets whether to activate a new session for a mobile node at the IPSG manager;
extracting information from the packets in order to link the packets to a subscriber profile associated with a mobile node and set up provision of at least one service to the packets;
obtaining information from the subscriber profile based on information received from the IPSG to set up a network processing unit (NPU) to direct incoming packets to a session manager for processing;
directing the packets received at the gateway to corresponding functions or servers for processing the packets in accordance with services specified in the subscriber profile;
managing the provision of multiple services to packets; and
directing the packets received at the NPU to the session manager to provide services to the packet flow.

10. The method of claim 9, wherein the inspecting of the packets includes inspecting signaling protocol messages received from the mobile node that meet certain criteria and extracting mobile node identifying information to obtain the subscriber profile.

11. The method of claim 9, wherein the information from the subscriber profile includes configuration information regarding services to be applied for the mobile node and a subscriber access control list (ACL), wherein the information regarding service includes information to route the packet flow through selected services.

12. The method of claim 9, further comprising obtaining at least identification information at the IPSG manager that is used to authenticate a session for the mobile node, set up the session, and link the session to the subscriber profile.

13. The method of claim 9, further comprising providing an enhanced charging in-line service and processing packets in accordance with the enhanced charging in-line service for a particular subscriber based on the subscriber profile.

14. The method of claim 9, wherein the IPSG manager is configured to receive packets from the NPU based on information in the packets and the IPSG manager inspects the packets received from the NPU.

15. The method of claim 9, further comprising managing policy communication at the session manager with a policy server to receive policy information and a charging server to report charging information for accounting purposes.

16. The method of claim 9, further comprising providing a serving general packet radio service support node (SGSN) functionality to the mobile node.

17. Logic encoded on one or more non-transitory tangible computer readable media for execution and when executed operable to:
- receive packets at an IP services gateway (IPSG) manager;
- inspect the packets and determine from the packets whether to activate a new session for a mobile node at the IPSG manager;
- extract information from the packets in order to link the packets to a subscriber profile associated with a mobile node and set up provision of at least one service to the packets;
- obtain information from the subscriber profile based on information received from the IPSG to set up a network processing unit (NPU) to direct incoming packets to a session manager for processing;
- direct the packets received at the gateway to corresponding functions or servers for processing the packets in accordance with services specified in the subscriber profile;
- manage the provision of multiple services to packets; and
- direct the packets received at the NPU the session manager to provide services to the packet flow.

18. The logic of claim 17, wherein the inspecting of the packets includes inspecting signaling protocol messages that meet certain criteria and extracting mobile node identifying information to obtain the subscriber profile.

19. The logic of claim 17, wherein the information from the subscriber profile includes configuration information regarding services to be applied for the mobile node and a subscriber access control list (ACL), wherein the information regarding service includes information to route the packet flow through selected services.

20. The logic of claim 17, wherein the logic is further configured to receive the packet flow at an enhanced charging in-line service and process the packet flow in accordance with the enhanced charging in-line service for a particular subscriber based on the subscriber profile.

* * * * *